United States Patent [19]

Uno et al.

[11] Patent Number: 4,801,509

[45] Date of Patent: Jan. 31, 1989

[54] PHOTOGRAPHIC RESIN COATED PAPER

[75] Inventors: Akira Uno, Matsudo; Touru Noda, Tokyo, both of Japan

[73] Assignee: Mitsubishi Paper Mills, Ltd., Tokyo, Japan

[21] Appl. No.: 881,964

[22] Filed: Jul. 3, 1986

[30] Foreign Application Priority Data

Jul. 5, 1985 [JP] Japan ................................ 60-148698

[51] Int. Cl.$^4$ ................................................ B32B 23/08

[52] U.S. Cl. .................................... 428/513; 428/511; 428/537.5; 428/357; 428/38; 430/538; 430/536

[58] Field of Search ..................... 428/537.5, 511, 357, 428/386, 513; 430/538, 536, 947

[56] References Cited

U.S. PATENT DOCUMENTS

| | | | |
|---|---|---|---|
| 4,389,455 | 6/1983 | Asao | 428/513 |
| 4,442,200 | 4/1984 | Asao | 428/513 |
| 4,447,524 | 5/1984 | Uno et al. | 428/513 |
| 4,572,893 | 2/1986 | Asao | 428/144 |
| 4,650,747 | 3/1987 | Uno et al. | 523/351 |

FOREIGN PATENT DOCUMENTS

| | | |
|---|---|---|
| 587630 | 7/1981 | Japan . |
| 220140 | 6/1982 | Japan . |
| 121329 | 7/1984 | Japan . |
| 2138964 | 10/1984 | United Kingdom . |

*Primary Examiner*—Edith Buffalow
*Attorney, Agent, or Firm*—Cushman, Darby & Cushman

[57] ABSTRACT

Disclosed is a photographic resin coated paper which is excellent in surface quality. This photographic resin coated paper comprises a paper or synthetic paper substrate having on at least one surface a layer of resin composition comprising a reisn and a titanium dioxide pigment which is prepared by the external seed method and milled by a fluid energy mill. The titanium dioxide pigment is preferably surface treated with an inorganic surface treating agent such as hydrous aluminum oxide. The resin is preferably a thermoplastic resin such as a polyolefin resin.

16 Claims, No Drawings

PHOTOGRAPHIC RESIN COATED PAPER

BACKGROUND OF THE INVENTION

This invention relates to a photographic resin coated paper which comprises a paper or synthetic paper substrate at least one surface of which is coated with a resin composition comprising at least a titanium dioxide pigment and a resin. More particularly, it relates to a photograhic resin coated paper excellent in surface quality with substantially no micro-grits on the coated resin surface.

The term "micro-grits" used in this specification means fine materials or particles which appear on the surface of the coated resin in the photographic resin coated paper comprising a paper or synthetic paper substrate at least one surface of which is coated with a resin composition.

There are many causes for formation of the micro-grits. For example, causes for formation of micro-grits which appear on photographic resin coated papers made by melt extrusion coating of a thermoplastic resin on at least one surface of a paper or synthetic paper substrate by a melt extruder are as follows: (1) Use of thermoplastic resins which are apt to form gel; (2) When molten resin is extruded in a form of film through a die of melt extruder, proper temperature cannot be kept to result in a ununiform flow; (3) Stain of screen provided on breaker plate in the melt extruder, (4) Cracks in barrel liner of the melt extruder, (5) Insufficient kneading in the melt extruder, etc. However, in many cases, these are relatively easily solved by those skilled in the arts.

However, the most difficult is to prevent the formation of micro-grits on photographic resin coated papers comprising a paper or synthetic paper substrate coated with a resin composition comprising at least a thermoplastic resin and a pigment.

Usually, a pigment is incorporated in a thermo-plastic resin, preferably a polyolefin resin by a method which comprises previously preparing the so-called master batch containing a pigment in a high concentration and diluting it to the desired proportion with diluting resins or a method which comprises making the co-called compound by incorporating the pigment in the resin at the desired proportion from the first.

However, when the master batch or the compound is prepared by melt kneading a thermoplastic resin and a pigment by using the common melt kneading devices, especially, such as Banbury mixer and kneader, it often occurs that relatively coarse pigment particles or agglomerate of titanium dioxide particles are not finely dispersed in the thermoplastic resin, but are dispersed as they are, in the form of relatively coarse pigment particles or agglomerate of titanium dioxide particles. Thus, there are coarse pigment particles in the master batch or the compound. As a result, micro-grits are formed on the resin surface of photographic resin coated paper comprising a paper or synthetic paper substrate at least one surface of which is coated with a resin composition of pigment and resin prepared using said master batch or compound.

Significant photographic problems are brought about if micro-grits are present in resin coated papers used as photographic supports. That is, when a person is photographed on a photographic paper having a resin coated paper having micro-grits as a photographic support and if the micro-grits appear in the face of the person, commercial value of such photographs is completely lost.

It is well known that titanium dioxide pigment is generally used as a pigment contained in a resin layer on emulsion layer side of resin coated paper as a photographic support because of it's excellent whiteness, hiding power, resolving power, etc.

Photographic resin coated papers are also known. For example, those which comprise a paper substrate both surfaces of which are coated with a polyolefin resin, especially, polyethylene resin, the polyolefin resih layer on the emulsion coated side containing titanium dioxide pigment, colored pigment, fluorescent brighter, etc. are well known and disclosed in U.S. Pat. No. 3,501,298. Furthermore, as disclosed in Japanese Patent Unexamined Publication (Kokai) No. 30830/82, there are known photographic resin coated paper which comprise a paper substrate coated with a resin composition which is hardened with polymerization by electron radiation and which contains a white pigment such as titanium dioxide.

However, when the photographic resin coated papers which comprise a paper or synthetic paper substrate at least one surface of which is coated with a resin composition comprising at least a titanium dioxide pigment and a resin are produced using the master batch or compound of the titanium dioxide pigment as mentioned above, there has been the serious problem that micro-grits are apt to be formed on the resin surface of the resin coated papers due to coarse particles of pigment, titanium dioxide pigment in this case.

SUMMARY OF THE INVENTION

It is therefore an object of this invention to provide a photographic resin coated paper excellent in surface quality which contains titanium dioxide pigment in resin layer and on which no or substantially no micro-grits are formed.

DESCRIPTION OF THE INVENTION

Usually, titanium dioxide is produced by the so-called self-seed method which includes crystallization and separation of iron sulfate from a solution obtained by treating ilmenite with sulfuric acid and boiling a titanyl sulfate solution separated therefrom to carry out hydrolysis in which to a warm water was added the titanyl sulfate solution to effect the hydrolysis to deposit titanium hydroxide which is used as a seed. However, in this method, because of combination of the complicated factors such as concentration of the titanyl sulfate, temperature and time of the hydrolysis, etc., control of particle size is very difficult and variability of particle size is great and formation of coarse particles can be controlled with difficulty.

Therefore, it has often occurred to cause formation of micro-grits when titanium dioxide pigment prepared in the above manner is used in resin layer on the emulsion coated side of photographic resin coated paper.

As a result of the inventor's intensive researches, it has been found that titanium dioxide pigment produced by external seed method and is milled by a fluid energy mill is used as the titanium dioxide pigment in resin coated paper which comprises a paper or synthetic paper substrate at least one surface of which is coated with a resin composition comprising at least a titanium dioxide pigment and a resin, no or substantially no micro-grits are formed on the resin surface. That is, in the case of the titanium dioxide pigment used in this invention which is produced by the external seed method used in this invention which includes addition, as a seed, of a hydroxide of titanium which has been separately prepared by neutralization of titanyl sulfate or titanium tetrachloride at the time of boiling the titanyl sulfate solution to effect hydrolysis, titanium dioxide having the desired particle size and a uniform particle size distribution can be freely produced and furthermore, there can be produced titanium dioxide pigment which causes substantially no formation of micro-grits when a fluid energy mill is used, especially in combination with a steam mill at the finishing step.

The "external seed method" used in this invention is for production of titanium dioxide which includes externally adding as a seed, a hydroxide of titanium which has been previously and separately prepared, at the time of hydrolysis as mentioned hereinbefore and is basically different from the self-seed method in which titanium dioxide deposited therein is used as a seed. Thus, the titanium dioxide produced by the external seed method has a well-balanced particle size distribution and so re-agglomeration of titanium dioxide hardly occurs during storage. Besides, master batches contain few agglomerates.

As the titanium dioxide pigment, there may be used any of rutile type or anatase type as long as they are produced by the external seed method of this invention and are milled by a fluid energy mill. Those of anatase type are preferred to rutile type in the whiteness. Furthermore, they may be the so-called non-treated titanium dioxide which has been subjected to no surface treatment or may be the so-called inorganic surface treated titanium dioxide which has been subjected to surface treatment with various inorganic surface treating agents, e.g., hydrous aluminum oxide, hydrous silicon oxide, hydrous titanium oxide, hydrous zirconium oxide, zinc hydroxide, magnesium hydroxide, manganese compounds, phosphoric acid compounds and combination of some of them.

Amount of these inorganic surface treating agents used for the treatment is preferably 0.2–1.2% by weight (in terms of anhydride) of titanium dioxide, especially preferably, 0.2–0.6% by weight (in terms of anhydride) of titanium dioxide.

According to the inventors' examination, hydrous aluminum oxide is preferred as the inorganic surface treating agents and amount thereof for treatment is preferably 0.2–1.2% by weight (in terms of $Al_2O_3$), especially preferably, 0.2–0.6% by weight (in terms of $Al_2O_3$) of titanium dioxide. It has been found that the titanium dioxide according to this invention which has been surface treated with hydrous aluminum oxide in an amount of 0.2–1.2% by weight, especially preferably 0.2–0.6% by weight (in terms of $Al_2O_3$) of titanium dioxide, not only formation of micro-grits is very few, but die lip stains are markedly prevented and troubles during operation is conspicuously decreased.

The die lip stains are needle-like or icicle-like deposits or dirts on the tips of the die lip which are produced when a thermoplastic resin composition containing a titanium dioxide pigment is melt extruded in the form of a film from a slit die of melt extruder. They are apt to grow rapidly with lapse of melt extrusion time.

If the die lip stain occurs at the time of melt extrusion coating, streaks are formed on the surface of resin coated paper or streaked irregularities occur due to uneven coating amount. In some case, the stains stick to film to produce extraneous matters. Thus, the surface quality of resin coated paper made for photographic support is seriously damaged and loses commercial value as the photographic support. Furthermore, in order to completely remove the die lip stains, production must be stopped and the die lip must be cleaned. This requires much manpower and time and productivity is conspicuously reduced.

The fluid energy mills used in this invention are those which perform milling by impingement of particles per se or impingement of particles against wall by highly accelerating the velocity of particles by energy of high pressure gas. They include air mill, steam mill, etc. and the steam mill which utilizes the energy of superheated steam may be advantageously used. There are, of course, no problems in using air mill in addition to steam mill.

As resins used in this invention, mention may be made of those which can be coated in the form of a film on a substrate such as homopolymers, e.g., polyolefins, polystyrenes, polyvinyl chloride, polyacrylic esters, linear polyesters such as polyethylene terephthalate, polycarbonate, polyamides such as nylon, cellulose esters, polyacrylonitrile and the like and copolymers, e.g., ethylene-vinyl acetate copolymer and mixtures thereof. Of these resins preferred are thermoplastic resins such as polyolefins, polystyrene, polyvinyl chloride, etc. and especially preferred are polyolefin resins from the points of extrusion coating properties, adhesiveness to substrate paper and cost.

The polyolefin resins used in this invention include homopolymers such as low-density polyolefin, medium-density polyolefin, high-density polyolefin, polypropylene, polybutene, polypentene, etc., copolymers comprising two or more olefins such as ethylene-propylene copolymer, linear low-density polyethylene which is a copolymer of ethylene and α-olefin and mixtures of these polymers. These polyolefin resins having various densities and melt indexes (abbreviated as "MI" hereinafter) may be used alone or in admixture.

When the content of the titanium dioxide pigment in the resin layer of the photographic resin coated paper according to this invention is less than 5% by weight of the resin, hiding power as a photographic support is insufficient and when it is more than 40% by weight, fluidity, etc. are deteriorated. Thus, the content of the titanium dioxide pigment is preferably 5–40% by weight. Especially preferred content is within the range of 7.5–25% by weight.

Preferably, a metallic salt of a fatty acid is added to the resin layer of the photographic resin coated paper of this invention. As examples of the metallic salts of fatty acid, mention may be made of zinc stearate, calcium stearate, aluminum stearate, magnesium stearate, zirconium octylate, sodium palmitate, calcium palmitate, sodium laurate, etc. Amount of addition of the metallic salts is preferably 0.01–5% by weight of the resin composition containing the titanium dioxide. When the amount of the metallic salt is less than 0.01% by weight, dispersion is insufficient and micro-grits are produced. On the other hand, when the amount of the metallic salt is more than 5% by weight, shearing is insufficient, i.e., kneading is insufficient and furthermore much smoking occurs at extrusion coating due to decomposition of the metallic salt of fatty acid at high temperatures and the decomposition products of the metallic salt adhere to and condenses on a hood for removal of smoke and drop at a later time to form spots on resin coated paper. This is serious defect.

In addition to the titanium dioxide pigment and the metallic salt of fatty acid, if present, there may be added to the resin layer of resin coated papers a white pigment such as zinc oxide, talc, calcium carbonate or the like, a fatty acid amide such as stearic acid amide, arachidic acid amide or the like, an anti-oxidant such as tetrakis[-methylene-3(3,5-di-tert-butyl-4-hydroxy-phenyl)propionate]methane, 2,6-di-tert-butyl-4-methyl-phenol or the like, colored pigment such as cobalt blue, Prussian blue, ultramaine or the like, fluorescent brightener, etc.

The photographic resin coated paper of this invention is generally produced by melt extrusion coating a molten resin composition containing a titanium dioxide pigment extruded in a film form from a slit die onto a running paper or synthetic paper substrate (called merely "substrate paper" hereinafter). In case of the resin being a polyolefin resin, melt extrusion temperature is preferably 200° C.-350° C. Furthermore, the substrate paper is preferably subjected to an activation treatment such as corona discharge treatment or flame treatment. The thickness of the resin layer has no limitation, but advantageously is 5-50 microns. In case of the ordinary resin coated papers comprising a substrate paper coated on both surfaces with resin, the surface of the resin containing titanium dioxide pigment may be a gloss surface, a matte surface, silk surface and the like depending on uses, the back surface is generally a non-gloss surface and the top surface and, if necessary, both the top and back surfaces may be subjected to an activation treatment such as corona discharge treatment or flame treatment.

The substrate paper used in this invention may be any of natural pulp paper, synthetic fiber paper or so-called synthetic paper obtained by making paper-like a synthetic resin film, but preferred is natural pulp paper mainly composed of softwood pulp, hardwood pulp or softwood and hardwood mixed pulp. There is no specific limitation in the thickness of the substrate paper, but that of good surface smoothness is preferred and its preferred basis weight is 50 g/m$^2$-250 g/m$^2$.

The substrate papers mainly composed of natural pulp which may be advantageously used in this invention may contain various high polymer compounds and additives. For example, the followings may be added. Cationized starch, cationized polyacrylamide, anionized polyacrylamide, carboxy-modified polyvinyl alcohol, gelatin, etc. as dry paper strength enhancing agents; fatty acid salts, rosin derivatives, dialkyl ketene dimer emulsified products, petroleum resin emulsion, ammonium salts of styrene-maleic anhydride copolymer alkyl esters, etc. as sizing agents; clay, kaolin, calcium carbonate, barium sulfate, titanium oxide, etc. as pigments; melamine resin, urea resin, epoxidized polyamide resin, etc. as wet paper strength enhancing agents; polyvalent metallic salts such as aluminum sulfate, aluminum chloride, cation modified polymers such as cationized starch, etc. as fixing agents; sodium hydroxide, sodium carbonate, hydrochloric acid, etc. as pH regulators; sodium chloride, Glauber's salt, etc. as inorganic electrolytes; dyes; fluorescent brighteners; latices and the like.

Various silver halide photographic emulsion layers may be provided on the photographic resin coated papers of this invention. For example, silver chloride, silver bromide, silver chlorobromide, silveriodobromide, silver chloroiodobromide emulsion layers may be provided. Furthermore, color couplers may be added to the silver halide photographic emulsion layers to form multilayer silver halide photographic constituting layers. As the binders for these silver halide emulsion layers, there may be used a common gelatin and furthermore hydrophilic high polymer materials such as polyvinylpyrrolidone, polyvinyl alcohol, sulfuric acid ester compound of polysaccharides and the like. Moreover, the silver halide emulsion layers may contain various additives, for example, sensitizing dyes such as cyanine dyes, merocyanine dyes, etc.; chemical sensitizers such as water soluble gold compounds, sulfur compounds, etc., anti-foggants or stabilizers such as hydroxytriazolopyrimidine compounds, mercapto-heterocyclic compounds, etc., hardeners such as formalin, vinylsulfon compounds, aziridine compounds, etc., coating assistants such as benzene-sulfonates, sulfosuccinate ester salts, etc., anti-staining agents such as dialkylhydroquinone compounds, etc., development accelerators such as hydroquinone, phenidone, etc., ultraviolet absorbing agents such as benzotriazole compounds, etc., fluorescent brightening agents, sharpness improving dyes, antistatic agents, pH regulators, etc. Water soluble iridium compounds, water soluble rhodium compounds, etc. may further be added at the time of formation or dispersion of silver halide. These may be used in suitable combination.

On the back surface of the photographic resin coated paper of this invention, namely, opposite to the photographic layer side, in many cases, the silver halide photographic layer side, there may be provided a coating layer comprising hydrophilic colloid layer called a back coat layer for anti-curling, anti-static, anti-sticking and anti-slipping purposes. This back coat layer may contain binder, protective colloid, hardening agent, anti-static agent, surface active agent, matting agent, latex, etc.

This invention will be illustrated in the following examples.

EXAMPLE 1

Titanium dioxide was prepared by external seed method. That is, in the course of production of anatase type titanium dioxide by sulfate process, to titanyl sulfate solution was added, as seed, hydroxide of titanium previously and separately prepared by neutralizing titanyl sulfate solution, followed by heating and boiling the solution to effect hydrolysis thereby to obtain titanium dioxide. This was then subjected to filtration and washing-calcining-wet milling-classification-surface treatment (removal of untreated titanium dioxide)-filtration and washing-drying-milling by hammer mill. The above surface treatment was effected with aqueous solution of sodium aluminate in such a treating amount as shown in No. 2-No. 6 in Table 1. Thus obtained six titanium dioxides were further finely milled by passing them through steam mill.

Separately, titanium dioxide was prepared by the so-called self-seed method. That is, in the course of production of anatase titanium dioxide by sulfate process, titanyl sulfate solution was added to warm water to effect hydrolysis to produce titanium hydroxide as a seed, followed by heating and boiling the solution to effect hydrolysis to obtain titanium dioxide. This was subjected to the same steps as above for external seed method.

70 parts by weight of low-density polyethylene (density 0.92, MI=7), 30 parts by weight of each of thus obtained twelve titanium dioxide pigments and 1.5 part by weight of zinc stearate were well kneaded by Banbury mixer at 150° C. to obtain master batches containing each of said twelve titanium dioxide pigments.

Papers having a basis weight of 160 $g/m^2$ were made by beating a mixture of 50 parts by weight of hardwood bleached kraft pulp and 50 parts by weight of softwood bleached sulfite pulp to a Canadian Standard Freeness of 310 ml and further adding 3 parts by weight of cationized starch, 0.2 part by weight of anionized polyacrylamide, 0.4 part by weight of an alkylketene dimer emulsified product (in terms of ketene dimer) and 0.4 part by weight of polyaminopolyamide epichlorohydrin. Thus obtained wet papers were dried at 110° C. and then impregnated with 25 $g/m^2$ of a liquid which comprised 3 parts by weight of carboxy medified polyvinyl alcohol, 0.05 part by weight of a fluorescent brightener, 0.002 part by weight of a blue dye, 0.2 part by weight of citric acid and 97 parts by weight of water. Then, these papers were dried with hot air of 110° C. and calendered at a linear pressure of 90 Kg/cm and thereafter, both surfaces thereof were subjected to corona discharge treatment to obtain substrate papers for photographic resin coated paper.

Then, on the back surface of these substrate papers was coated a 1:1 mixture of high-density polyethylene (density 0.96 $g/cm^3$, MI=7) and low-density polyethylene (density 0.92 $g/cm^3$, MI=3) at a thickness of 30μ by a melt extrusion coater at a resin temperature of 320° C. Subsequently, on the top surface of the substrate papers was coated a resin composition composed of 30 parts by weight of the previously prepared master batch containing titanium dioxide pigment, 20 parts by weight of high-density polyethylene (density 0.96 $g/cm^3$, MI=7) and 50 parts by weight of low-density polyethylene (density 0.92 $g/cm^3$, MI=5) at a resin temperature of 320° C. and at a thickness of 30μ to obtain papers coated with polyethylene resin containing titanium dioxide pigment. The surface of the polyethylene containing titanium dioxide pigment was finished to completely smooth glossy surface and the surface of the back coated polyethylene was finished to a matte surface like a paper.

Number of die lip stains and number of micro-grits when resin compositions containing the titanium dioxide pigment were used are shown in Table 1.

The number of die lip stains and the number of mciro-grits were obtained in the following manners.

[THE NUMBER OF DIE LIP STAINS]

The resin compositions containing the titanium dioxide pigment as shown in Table 1 were melt extruded using a screw extruder having a screw diameter of 65 mm and a melt extruder having a T-die of 750 mm in width at a screw speed of 100 rpm, at a melting temperature of 320° C. for 2 hours and the number of die lip stains are shown.

[THE NUMBER OF MICRO-GRITS]

The number of micro-grits which appeared on the surface of the resin containing the titanium dioxide pigment on the photographic resin coated papers produced in Example were visually counted.

TABLE 1

| No. | Kind of titanium dioxide pigment contained in resin layer: Production method | Amount of surface treatment (% by weight of treating agent per $TiO_2$, calculated as $Al_2O_3$) | Number of micro-grits formed on the surface of resin containing titanium dioxide pigment (number/$m^2$) | Number of die lip stains: Front side | Rear side | Total |
|---|---|---|---|---|---|---|
| 1 | External | 0 | 0.2 | 0 | 0 | 0 |
| 2 | seed | 0.2 | 0.3 | 0 | 0 | 0 |
| 3 | method | 0.6 | 0.4 | 0 | 0 | 0 |
| 4 | | 1.0 | 1.0 | 1 | 0 | 1 |
| 5 | | 1.2 | 1.8 | 3 | 2 | 5 |
| 6 | | 2.0 | 3.4 | more than 50 | more than 50 | more than 100 |
| 7 | Self-seed | 0 | 9 | 0 | 0 | 0 |
| 8 | method | 0.2 | 11 | 0 | 0 | 0 |
| 9 | | 0.6 | 12 | 0 | 0 | 0 |
| 10 | | 1.0 | 15 | 1 | 1 | 2 |
| 11 | | 1.2 | 16 | 4 | 3 | 7 |
| 12 | | 2.0 | 19 | more than 50 | more than 50 | more than 100 |

For comparison, photographic resin coated papers (No. 1', 3', 5', 7', 9', and 11') were produced in the same manner as for No. 1–No. 12 except that there were used titanium dioxide pigments which were produced by the external seed method or the self-seed method, but were subjected to no milling by steam mill and to only the milling by hammer mill with no surface treatment, surface treatment of 0.6% by weight and that of 1.2% by weight. The number of micro-grits on each sample was counted and the results are shown in Table 2.

TABLE 2

| No. | Kind of titanium dioxide pigment contained in resin layer: Production method | Amount of surface treatment (% by weight of treating agent per $TiO_2$ calculated as $Al_2O_3$) | Number of micro-grits formed on the surface of resin containing titanium dioxide pigment (number/$m^2$) |
|---|---|---|---|
| 1' | External | 0 | 33 |
| 3' | seed | 0.6 | 39 |
| 5' | method | 1.2 | 48 |
| 7' | Self-seed | 0 | 38 |
| 9' | method | 0.6 | 46 |
| 11' | | 1.2 | 53 |

From the results of Table 1 it will be recognized that when titanium dioxide pigments which were produced by the external seed method and which were subjected to milling by hammer mill and subsequent milling by steam mill were used, number of micro-grits somewhat increased with increase in surface treatment amount, but the number was very few and thus there were obtained good titanium dioxide pigment. On the other hand, use of titanium dioxide produced by the self-seed method and similarly subjected to milling by hammer mill and subsequent milling by steam mill caused formation of a large number of micro-grits and the photographic resin coated papers produced with such titanium dioxide pigment lacked practicality. Furthermore, when amount of hydrous aluminum oxide used for the surface treatment exceeded 1% by weight, die lip stains occurred and especially when it was 2% by weight, much stain occurred. Moreover, these samples were subjected to irradiation by fadeometer FAL-25X-HCL manufactured by Suga Tester Co. for 120 hours and thereafter the irradiated surface of the samples was observed to find that the resin coated papers (No. 1 and No. 7) which contained untreated titanium dioxide extremely yellowed and could not be practically used.

It will be recognized from the results of Table 2 that when the comparative titanium dioxide pigments which had been subjected to only the milling by hammer mill and no milling by steam mill were used, a large number of micro-grits were formed on the resin surface of the obtained photographic resin coated papers regardless of whether the titanium dioxide was prepared by the external seed method or by the self-seed method.

Thus, for photographic resin coated papers, it is advantageous to use titanium dioxide pigment obtained by subjecting titanium dioxide prepared by the external seed method to milling by hammer mill and then milling by steam mill. Furthermore, when titanium dioxide pigment which had been subjected to surface treatment with hydrous aluminum oxide in an amount of 0.2–1.2% by weight, especially 0.2–0.6% by weight was used, very few micro-grits were formed and no stain occurred on die lip and thus good resin coated papers were obtained.

EXAMPLE 2

Titanium dioxide pigments were prepared in the same manner as in Example 1 except that the titanium dioxide was additionally subjected to air milling after milling by steam mill. Photographic resin coated papers were made using these titanium dioxide pigments and number of micro-grits formed on the resin surface was counted to obtain nearly the same results as in Example 1.

What is claimed is:

1. A photographic resin coated paper which comprises a paper or synthetic paper substrate at least one surface of which is coated with a resin composition comprising at least a titanium dioxide pigment and a resin, said titanium dioxide pigment being prepared by the external seed method, milled by a fluid energy mill and subjected to surface treatment with an inorganic surface treating agent.

2. A resin coated paper according to claim 1 wherein the fluid energy mill is a steam mill.

3. A resin coated paper according to claim 2 wherein the inorganic surface treating agent is hydrous aluminum oxide.

4. A resin coated paper according to claim 2 wherein the inorganic surface treating agent comprises hydrous aluminum oxide and an inorganic surface treating agent other than the hydrous aluminum oxide.

5. A resin coated paper according to claim 2 wherein amount of the inorganic surface treating agent is 0.2–1.2% by weight (in terms of anhydride) of the titanium dioxide.

6. A resin coated paper according to claim 5 wherein the amount of the inorganic surface treating agent is 0.2–0.6% by weight (in terms of anhydride) of the titanium dioxide.

7. A resin coated paper according to claim 3 wherein amount of the hydrous aluminum oxide is 0.2–1.2% by weight (in terms of $Al_2O_3$) of the titanium dioxide.

8. A resin coated paper according to claim 4 wherein amount of the hydrous aluminum oxide is 0.2–1.2% by weight (in terms of $Al_2O_3$) of the titanium dioxide.

9. A resin coated paper according to claim 7 wherein the amount of the hydrous aluminum oxide is 0.2–0.6% by weight (in terms of $Al_2O_3$) of the titanium dioxide.

10. A resin coated paper according to claim 8 wherein the amount of the hydrous aluminum oxide is 0.2–0.6% by weight (in terms of $Al_2O_3$) of the titanium dioxide.

11. A resin coated paper according to claim 1 wherein the resin is a thermoplastic resin.

12. A resin coated paper according to claim 11 wherein the thermoplastic resin is a polyolefin resin.

13. A resin coated paper according to claim 12 wherein the polyolefin resin is a polyethylene resin.

14. A resin coated paper according to claim 1 wherein the amount of the titanium dioxide pigment contained in the resin layer is 5–40% by weight of the resin.

15. A resin coated paper according to claim 1 wherein the resin layer containing the titanium dioxide pigment contains a metallic salt of a fatty acid.

16. A resin coated paper according to claim 15 wherein the content of the metallic salt of a fatty acid is 0.01–5% by weight the resin composition containing titanium dioxide.

* * * * *